(12) United States Patent
Jeong et al.

(10) Patent No.: US 8,830,427 B2
(45) Date of Patent: Sep. 9, 2014

(54) LIQUID CRYSTAL DISPLAY

(75) Inventors: Youn Hak Jeong, Cheonan-si (KR); Keunchan Oh, Cheonan-si (KR); Seunghee Lee, Jeonju-si (KR); Inyoung Cho, Jeonju-si (KR); Sung min Kim, Jeonju-si (KR)

(73) Assignees: Samsung Display Co., Ltd., Yongin, Gyeonggi-Do (KR); Industrial Cooperation Foundation Chongbuk National University, Jeonju-Si, Jeonbuk (KR)

( * ) Notice: Subject to any disclaimer, the term of this patent is extended or adjusted under 35 U.S.C. 154(b) by 538 days.

(21) Appl. No.: 12/971,890

(22) Filed: Dec. 17, 2010

(65) Prior Publication Data

US 2011/0304808 A1 Dec. 15, 2011

(30) Foreign Application Priority Data

Jun. 11, 2010 (KR) .......................... 10-2010-0055566

(51) Int. Cl.
*G02F 1/1337* (2006.01)

(52) U.S. Cl.
CPC .............. *G02F 1/133753* (2013.01); *G02F 2001/133757* (2013.01); *G02F 1/133788* (2013.01)
USPC ......................................... 349/129; 349/128

(58) Field of Classification Search
USPC ................................................. 349/128–129
See application file for complete search history.

(56) References Cited

U.S. PATENT DOCUMENTS

| | | | |
|---|---|---|---|
| 2003/0142257 A1* | 7/2003 | Chaudhari et al. | 349/129 |
| 2005/0117100 A1* | 6/2005 | Terashita et al. | 349/129 |
| 2006/0262261 A1* | 11/2006 | Takeda et al. | 349/130 |
| 2009/0191782 A1* | 7/2009 | Shin et al. | 445/25 |
| 2009/0284702 A1* | 11/2009 | Seo et al. | 349/128 |

FOREIGN PATENT DOCUMENTS

| | | |
|---|---|---|
| KR | 1020000058905 A | 10/2000 |
| KR | 1020020002088 A | 1/2002 |
| KR | 1020040098327 A | 11/2004 |
| KR | 1020080114352 A | 12/2008 |

* cited by examiner

*Primary Examiner* — Bumsuk Won
*Assistant Examiner* — Charles Chang
(74) *Attorney, Agent, or Firm* — F. Chau & Associates, LLC

(57) ABSTRACT

A liquid crystal display includes a first substrate and a second substrate facing the first substrate. A first alignment layer formed on the first substrate includes a first area aligned in a first direction and a second area aligned in a second direction opposite to the first direction, and a second alignment layer formed on the second substrate includes a third area aligned in a third direction different from the first direction and a fourth area aligned in a fourth direction opposite to the third direction. Liquid crystal molecules in a liquid crystal layer disposed between the first and second alignment layers are aligned in different directions from each other in plural domains defined by the first to fourth areas. Thus, the liquid crystal display may have improved aperture ratio and transmittance.

20 Claims, 13 Drawing Sheets

LIQUID CRYSTAL DISPLAY

CROSS-REFERENCE TO RELATED APPLICATION

This U.S. non-provisional patent application claims priority under 35 U.S.C. §119 to Korean Patent Application No. 10-2010-0055566 filed on Jun. 11, 2010, the entire disclosure of which is hereby incorporated by reference herein in its entirety.

BACKGROUND

1. Technical Field

The present invention relates to a liquid crystal display. More particularly, the present invention relates to a liquid crystal display capable of improving a display quality.

2. Description of the Related Art

In general, a liquid crystal display (LCD) applies a voltage to a liquid crystal layer and controls a light transmittance of the liquid crystal layer to display an image. However, since an LCD may have a relatively narrow viewing angle, recently a vertical alignment mode liquid crystal display in which a pixel is divided into a plurality of domains having different alignment directions has been developed in order to obtain a wide viewing angle.

In the vertical alignment mode liquid crystal display, a cutting-off portion or a protruding portion is formed with an electrode used to generate an electric field so that the domains may be formed in the pixel. However, the above-mentioned structure may cause deterioration of an aperture ratio of the liquid crystal display, and the liquid crystal molecules arranged far from the cutting-off or the protruding portion may then have slow response speed due to a random motion and an after-image may occur due to a reverse domain.

Thus, there is a need in the art for a liquid crystal display capable of increasing aperture ratio and transmittance to improve its display quality.

SUMMARY

Exemplary embodiments of the present invention may provide a liquid crystal display capable of increasing aperture ratio and transmittance to improve its display quality.

In accordance with some exemplary embodiments of the present invention, a liquid crystal display is provided. The liquid crystal display includes a display panel including a first substrate including a plurality of pixel areas and a plurality of pixel electrodes in the pixel areas, respectively and a second substrate including a common electrode facing the first substrate and the pixel electrodes, a first alignment layer formed on the pixel electrodes including a first area aligned in a first direction and a second area aligned in a second direction opposite to the first direction and a second alignment layer formed on the common electrode includes a third area aligned in a third direction different from the first direction and a fourth area aligned in a fourth direction opposite to the third direction. The liquid crystal display further includes a liquid crystal layer disposed between the first alignment layer and the second alignment layer and includes liquid crystal molecules that are aligned in different directions from each other in plural domains defined by the first area, the second area, the third area and the fourth area and a polarizing plate attached to one surface of the display panel and including a transmission axis and an absorption axis that is substantially perpendicular to the transmission axis.

According to other exemplary embodiments, a liquid crystal display includes a display panel displaying an image and a polarizing plate attached to one surface of the display panel and having a transmission axis and an absorption axis that is substantially perpendicular to the transmission axis. The display panel includes a first substrate, a second substrate, a first alignment layer, a second alignment layer, and a liquid crystal layer.

The first substrate includes a plurality of pixel areas and a plurality of pixel electrodes arranged in the pixel areas, respectively. The first alignment layer covers the pixel electrodes and includes a first area aligned in a first direction that makes a first angle in a clockwise direction with reference to the transmission axis in a plan view and a second area aligned in a second direction that is opposite to the first direction. The first area and the second area are obtained by dividing each of the pixel areas into two areas along a direction substantially parallel to the transmission axis.

The second substrate includes a common electrode facing the pixel electrodes. The second alignment layer covers the common electrode and includes a third area aligned in a third direction that makes a second angle in a counter clockwise direction with reference to the absorption axis and a fourth area aligned in a fourth direction that is opposite to the third direction, and the third direction is different from the first and second directions. The third area and the fourth area are obtained by dividing an area of the second substrate corresponding to each of the pixel areas into two areas along a direction substantially parallel to the absorption axis.

The liquid crystal layer is disposed between the first alignment layer and the second alignment layer and includes liquid crystal molecules that are aligned in different directions from each other in a plurality of domains in each of the pixel areas.

According to the above, the first and second alignment layers are aligned in different directions by using a photo alignment method to form the domains in one pixel instead of patterning a pixel electrode or forming a protruding portion. In addition, the first and second alignment layers are aligned in directions different from the transmission axis or the absorption axis in a plan view. Therefore, various alignment directions of the liquid crystal molecules may be obtained by a sum of vectors of the alignment directions of the first and second alignment layers, thus the alignment directions of the liquid crystal molecules may be minutely controlled.

BRIEF DESCRIPTION OF THE DRAWINGS

Exemplary embodiments of the present invention can be understood in more detail from the following detailed description taken in conjunction with the accompanying drawings wherein.

DETAILED DESCRIPTION

Figure 1:
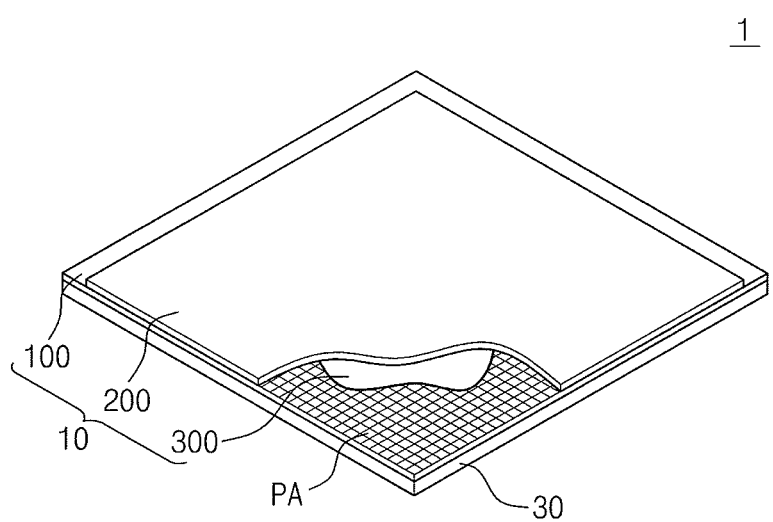
FIG. 1 is a perspective view showing a liquid crystal display according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
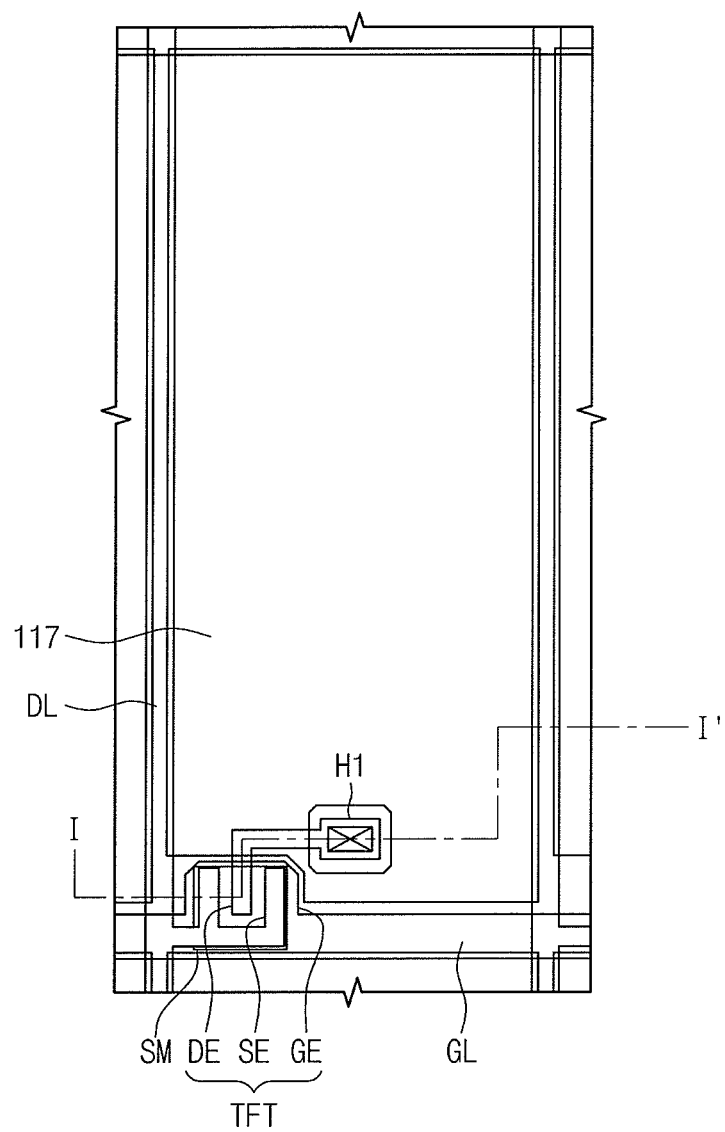
FIG. 2 is a partially enlarged plan view showing a liquid crystal display of FIG. 1.
Figure 3:
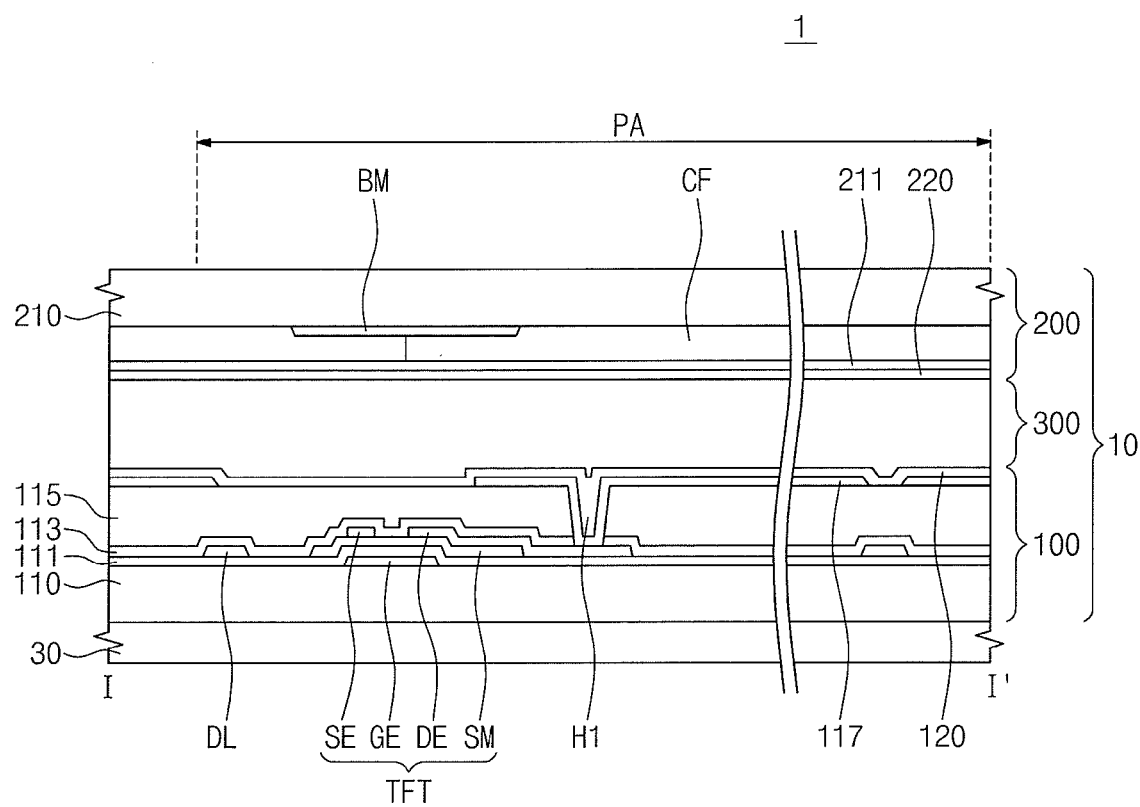
FIG. 3 is a cross-sectional view taken along a line I-I' of FIG. 2.

FIG. 1 is a perspective view showing a liquid crystal display according to an exemplary embodiment of the present invention, FIG. 2 is a partially enlarged plan view showing the liquid crystal display of FIG. 1, and FIG. 3 is a cross-sectional view taken along a line I-I' of FIG. 2.

Referring to FIGS. 1 to 3, a liquid crystal display 1 includes a display panel 10 and a polarizing plate 30. The display panel 10 includes a first substrate 100, a second substrate 200, and a liquid crystal layer 300 disposed between the first substrate 100 and the second substrate 200. The polarizing plate 30 is provided on both surfaces of the display panel 10, but for the convenience of explanation, one polarizing plate 30 will be described in detail with reference to FIG. 1.

The polarizing plate 30 is attached to one surface of the display panel 10 and includes a transmission axis and an absorption axis that is substantially perpendicular to the transmission axis. The polarizing plate 30 transmits a light that is parallel to the transmission axis and the light is provided to the display panel 10.

The first substrate 100 includes a first base substrate 110 on which a plurality of pixel areas PA are defined, a plurality of gate lines GL, a plurality of data lines DL, a plurality of thin film transistors TFT, a plurality of pixel electrodes 117, and an alignment layer 120. Each pixel area PA includes a corresponding gate line, a corresponding data line, a corresponding thin film transistor, a corresponding pixel electrode, and a portion of the first alignment layer 120.

The pixel areas PA are arranged in a matrix configuration defined by columns and rows. Since the pixel areas have the same structure and function, for the convenience of explanation, one pixel area PA will be described in detail. In addition, each pixel area PA has a rectangular shape extended in one direction. However, the shape of the pixel area PA is not limited to the rectangular shape. That is, the pixel area PA may be formed in various shapes such as, for example, a V-shape, Z-shape, and so forth.

The gate line GL is arranged on the first base substrate 110 and extended in one direction. The data line DL is arranged on the first base substrate 110 and crosses the gate line GL to be insulated from the gate line GL.

The thin film transistor TFT is arranged adjacent to an area where the gate line GL crosses the data line DL. The thin film transistor TFT includes a gate electrode GE branched from the gate line GL, a source electrode SE branched from the data line DL, and a drain electrode DE spaced apart from the source electrode SE. The pixel electrode 117 is connected to the drain electrode DE.

Referring to FIG. 3, a semiconductor pattern SM is arranged above the gate electrode GE and a first insulating layer 111 is interposed therebetween. The source electrode SE and the drain electrode DE that are spaced apart from each other are arranged on the semiconductor pattern SM, and the data line DL is arranged on the same layer where the source electrode SE and the drain electrode DE are arranged.

A second insulating layer 113 is arranged on the first insulating layer 111 on which the source and drain electrodes SE and DE are arranged, and a protective layer 115 is arranged on the second insulating layer 113. The pixel electrode 117 is arranged on the protective layer 115, and the pixel electrode 117 is electrically connected to the drain electrode DE through a contact hole H1 formed through the second insulating layer 113 and the protective layer 115.

The first alignment layer 120 is arranged on the pixel electrode 117 to cover the pixel electrode 117.

The second substrate 200 is arranged to face the first substrate 100. The second substrate 200 includes a second base substrate 210, color filters CF, a black matrix BM, a common electrode 211, and a second alignment layer 220.

The color filters CF and the black matrix BM are arranged on the second base substrate 210. The common electrode 211 and the second alignment layer 220 are sequentially provided on the color filters CF and the black matrix BM.

The color filters CF are arranged corresponding to the pixel areas PA. Each color filter CF displays one color of a red, green, or blue color. The black matrix BM is disposed between the color filters CF to block a light that transmits the liquid crystal layer 300 in an area corresponding to between the color filters CF. The common electrode 211 is formed over an entire surface of the color filters CF and the black matrix BM. The second alignment layer 220 is formed to cover the common electrode 211.

The liquid crystal layer 300 is disposed between the first alignment layer 120 and the second alignment layer 220. In the present exemplary embodiment, liquid crystal molecules of the liquid crystal layer 300 have a negative dielectric anisotropy.

The liquid crystal molecules of the liquid crystal layer 300 have different pre-tilt angles according to characteristics of the first and second alignment layers 120 and 220. Also, alignment directions of the first and second alignment layers 120 and 220 are decided by a photo-alignment method. For the photo-alignment method, a method in which ultraviolet rays having different polarizing directions are irradiated or a method in which a light is irradiated to a surface of the alignment layers at an inclined angle may be used.

Hereinafter, a method of aligning the first and second alignment layers and the alignment directions of the first and second alignment layers will be described in detail.

Figure 4A:
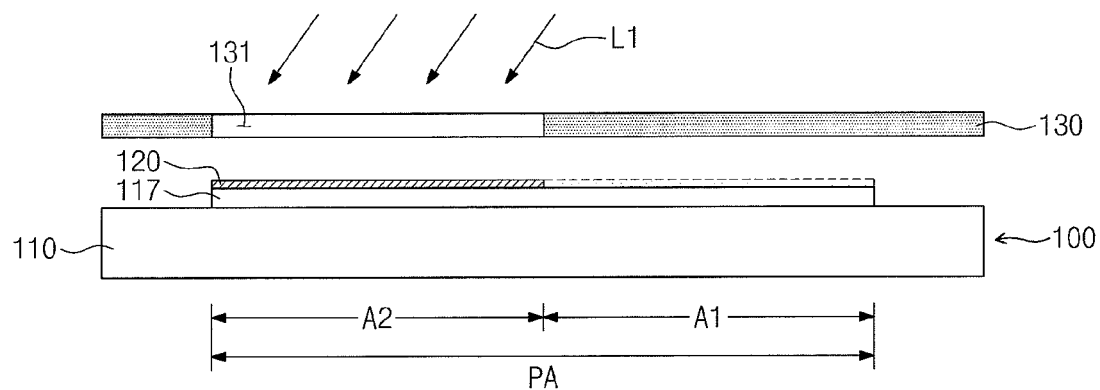
FIGS. 4A and 4B are cross-sectional views showing an alignment process of a first alignment layer according to an exemplary embodiment of the present invention.
Figure 4B:
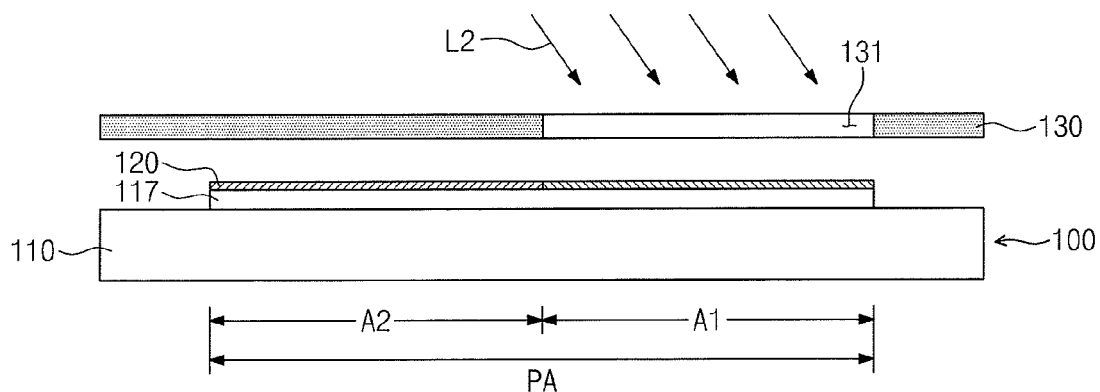
Figure 5A:
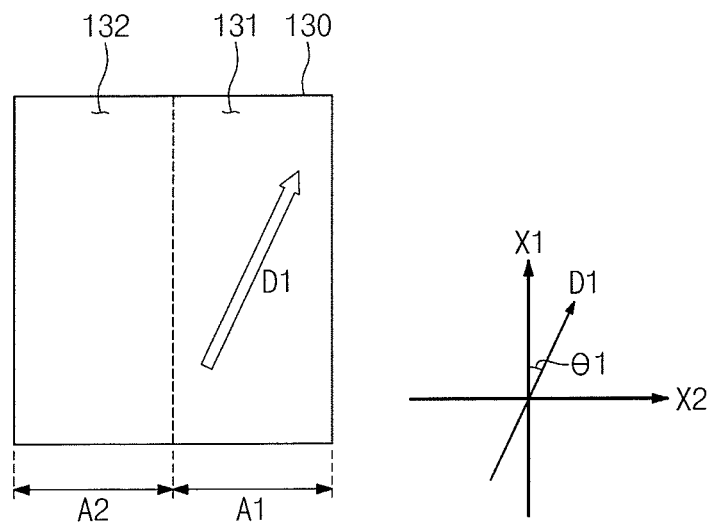
FIGS. 5A and 5B are plan views showing first masks each shown in FIGS. 4A and 4B, respectively.
Figure 5B:
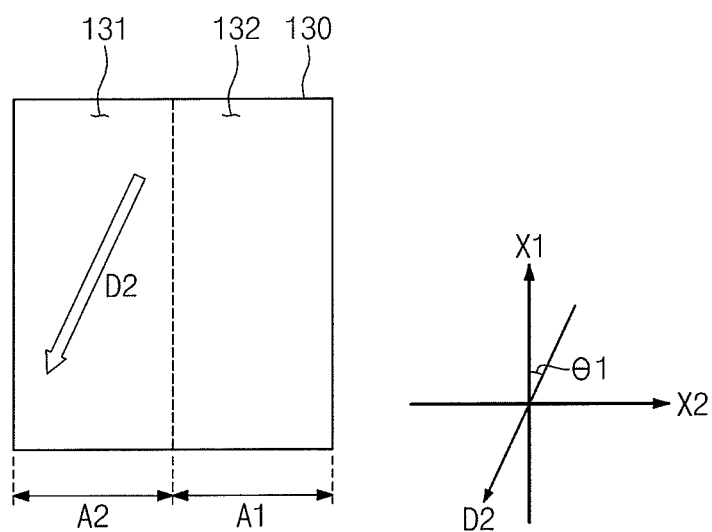

FIGS. 4A and 4B are cross-sectional views showing an alignment process of the first alignment layer arranged on the first substrate of the display panel. FIG. 5A is a plan view showing a first mask shown in FIG. 4A, and FIG. 5B is a plan view showing a first mask shown in FIG. 4B. In FIGS. 4A and 4B, for the convenience of explanation, layers disposed between the first base substrate 110 and the pixel electrode 117 of FIG. 3 will be omitted, and one pixel electrode 117 will be described in detail.

The first alignment layer 120 is arranged on the first substrate 100 to cover the pixel electrodes 117. For example, the first alignment layer 120 may include a polymer material, such as polyvinyl cinnamate-containing material (PVCN), polysiloxane cinnamate-containing material (PSCN), cellulose cinnamate-containing material (CelCN), etc., which is decomposed, dimerized, or isomerized by UV-irradiation.

A first mask 130 is arranged on the first alignment layer 120 with a plurality of first openings 131 and a plurality of first shielding parts 132. In FIGS. 5A and 5B, for the convenience of explanation, a portion of the first mask 130 corresponding to one pixel area PA has been described, but other portions of the first mask 130 have the same structure. In FIGS. 5A and 5B, when assuming that the transmission axis is referred to as X1 and the absorption axis substantially perpendicular to the transmission axis X1 is referred to as X2, the first opening 131 may be extended in the direction of the transmission axis X1 in the first mask 130 as shown in FIGS. 5A and 5B.

Meanwhile, each pixel area PA is divided into a first area A1 and a second area A2 along a direction that is substantially parallel to the transmission axis X1. Each of the first openings 131 of the first mask 130 is arranged corresponding to the first area A1 of each of the pixel areas PA and each of the first shielding parts 132 is arranged corresponding to the second area A2. When the first openings 131 are arranged corresponding to the first areas A1, respectively, light L1 may be inclined and irradiated to the first areas A1 of the first alignment layer 120 to perform a first exposure on the first areas A1. For example, during the first exposure on the first areas A1, a light exposure device (not shown) may move toward a first direction D1 to irradiate the light L1 to the first areas A1. The first direction D1 makes a first angle $\theta_1$ in a clockwise direction with reference to the transmission axis X1 in a plan view, and the first angle is within a range of $0° < \theta_1 < 90°$.

A method of inclinedly irradiating the light L1 to the surface of the first alignment layer 120 may be achieved by inclining the first base substrate 110 or the light exposure device.

Then, the first mask 130 is moved such that the first openings 131 are arranged respectively corresponding to the second areas A2 of the pixel areas PA. When the first openings 131 are arranged corresponding to the second areas A2 and the first shielding parts 132 are arranged corresponding to the first areas A1, light L2 may be inclinedly irradiated to the second areas A2 of the first alignment layer 120 to perform a second exposure on the second areas A2. During the second exposure on the second areas A2, the light exposure device may move toward a second direction D2 that is opposite to the first direction D1 to irradiate the light L2 to the second areas A2.

When the above-described first and second exposure processes are completely performed, a pre-tilt angle that is inclined to the first direction D1 may be formed in the first areas A1 of the first alignment layer 120, and a pre-tilt angle that is inclined to the second direction D2 may be formed in the second areas A2 of the first alignment layer 120. Thus, the first alignment layer 120 may vertically align the liquid crystal molecules of the liquid crystal layer 300 by the pre-tilt angle under no application of electric-field free state (OFF state).

Figure 6A:
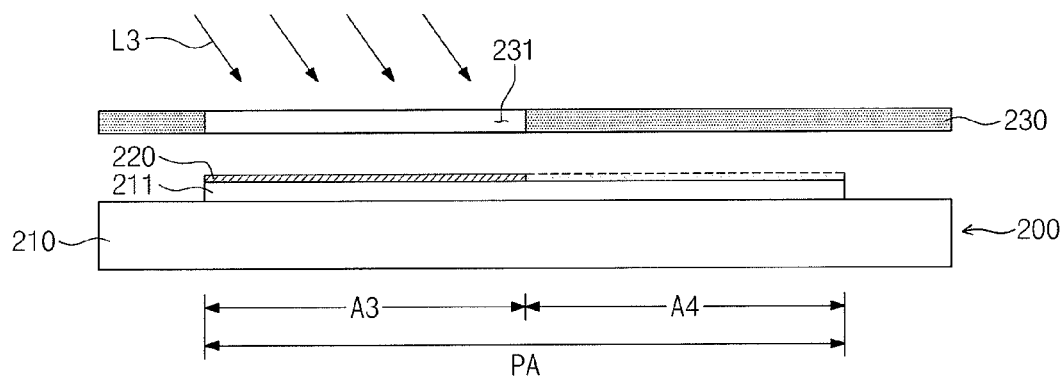
FIGS. 6A and 6B are cross-sectional views showing an alignment process of a second alignment layer according to an exemplary embodiment of the present invention.
Figure 6B:
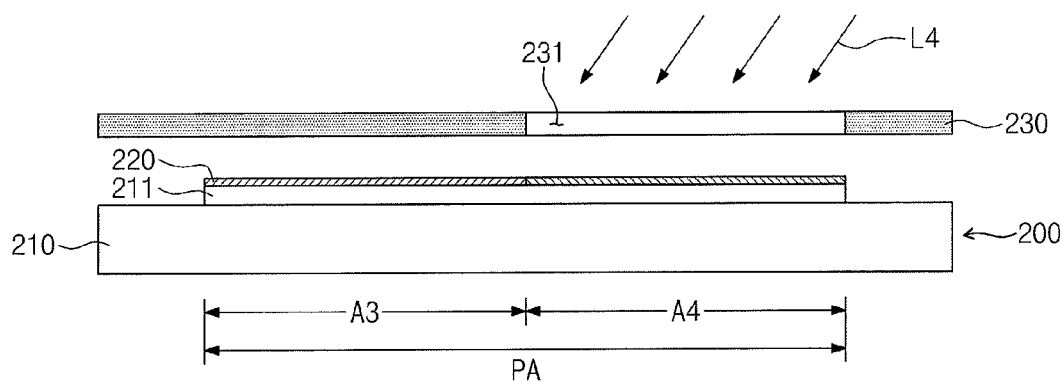
Figure 7A:
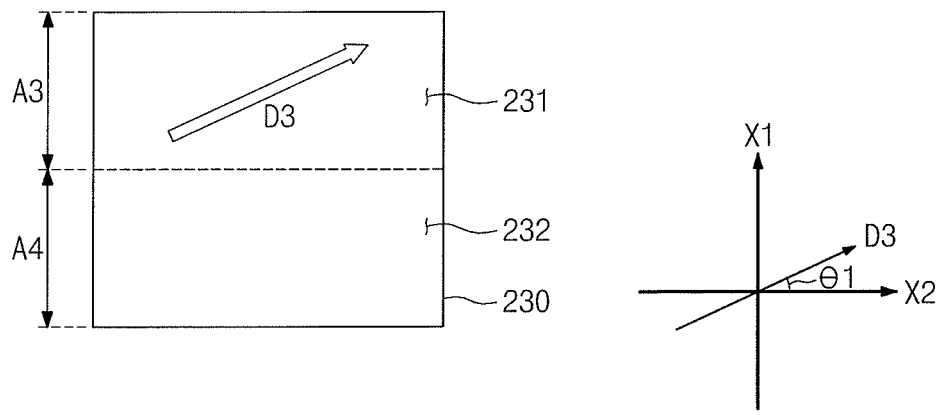
FIGS. 7A and 7B are plan views showing second masks each shown in FIGS. 6A and 6B, respectively.
Figure 7B:
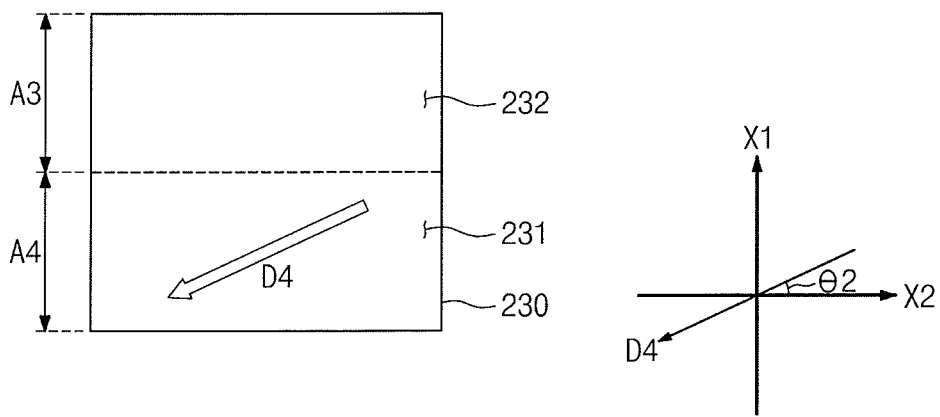

FIGS. 6A and 6B are cross-sectional views showing an alignment process of the second alignment layer arranged on the second substrate of the display panel. FIG. 7A is a plan view showing a second mask shown in FIG. 6A and FIG. 7B is a plan view showing a second mask shown in FIG. 6B. In FIGS. 6A and 6B, for the convenience of explanation, layers disposed between the second base substrate 210 and the common electrode 211 will be omitted.

The second alignment layer 220 is arranged on the second substrate 200 to cover the common electrode 211. For example, second alignment layer 220 may include a polymer material, such as polyvinyl cinnamate-containing material (PVCN), polysiloxane cinnamate-containing material (PSCN), cellulose cinnamate-containing material (CelCN), etc., which is decomposed, dimerized, or isomerized by an UV-irradiation.

A second mask 230 including a plurality of second openings 231 and a plurality of first shielding parts 232 is arranged on the second alignment layer 220. In FIGS. 7A and 7B, for the convenience of the explanation, a portion of the second mask 230 corresponding to one pixel area PA has been described, but other portions of the second mask 230 have the same structure. In FIGS. 7A and 7B, the second openings 231 of the second mask 230 are formed in parallel to the absorption axis X2 that is substantially perpendicular to the transmission axis X1.

Meanwhile, an area corresponding to each pixel area PA is divided into a third area A3 and a fourth area A4 along a direction that is parallel to the absorption axis X2. Each of the second openings 231 is arranged corresponding to the third areas A3 of each of the pixel areas PA and each of the second shielding parts 232 is arranged corresponding to the fourth areas A4. When the second openings 231 are arranged corresponding to the third areas A3, light L3 may be inclinedly irradiated to the third areas A3 of the second alignment layer 220 to perform a third exposure to the third areas A3. For example, during the third exposure process to the third areas A3, the light exposure device (not shown) may move toward a third direction D3 to irradiate the light L3 to the third area A3. The third direction D3 makes a second angle $\theta_2$ with reference to the absorption axis X2 in a plan view, and the second angle $\theta_2$ is within a range of $0°<\theta_2<90°$. In the present exemplary embodiment, the first angle $\theta_1$ and the second angle $\theta_2$ have the same value, but it should not be limited thereto or thereby. That is, the first angle $\theta_1$ and the second angle $\theta_2$ may be different from each other.

A method of inclinedly irradiating the light L3 to the surface of the second alignment layer 220 may be achieved by inclining the second base substrate 210 or the light exposure device.

Then, the second mask 230 is shifted such that each of the second openings 231 are arranged corresponding to the fourth areas A4 of the pixel areas PA. When the second openings 231 are arranged corresponding to the fourth areas A4 and the second shielding parts 232 are arranged corresponding to the third areas A3, light L4 may be inclinedly irradiated to the fourth areas A4 of the second alignment layer 220 to perform a fourth exposure to the fourth areas A4. During the fourth exposure process to the fourth areas A4, the light exposure device may move toward a fourth direction D4 that is opposite to the third direction D3 to irradiate the light L4 to the fourth areas A4.

When the above-mentioned third and fourth exposure processes are completely performed, a pre-tilt angle that is inclined to the third direction D3 is formed in the third areas A3 of the second alignment layer 220, and a pre-tilt angle that is inclined to the fourth direction D4 is formed in the fourth areas A4 of the second alignment layer 220. Thus, the second alignment layer 220 may vertically align the liquid crystal molecules of the liquid crystal layer 300 by the pre-tilt angle under no application of electric-field free state (OFF state).

Hereinafter, the alignment directions of the first and second alignment layers by the photo-alignment method and the alignment directions of the liquid crystal molecules in each domain by the first and second alignment layers will be described.

Figure 8A:
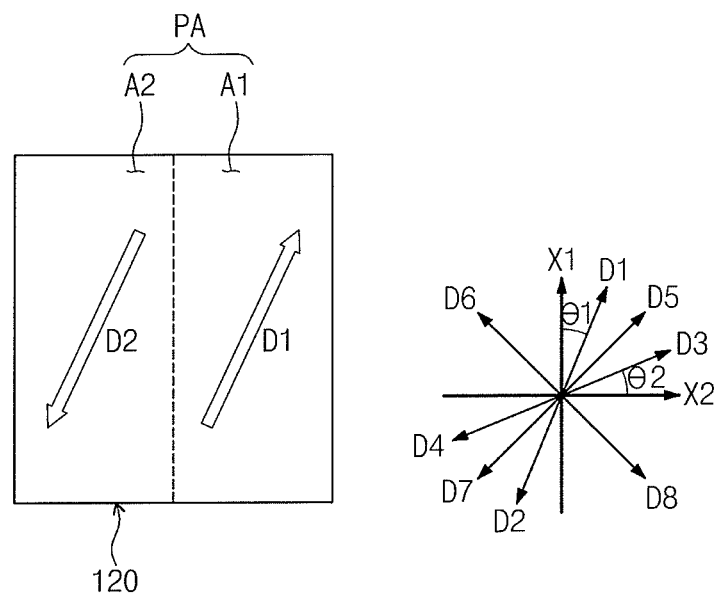
FIGS. 8A and 8B are plan views respectively showing an alignment direction of the first and second alignment layers.
Figure 8B:
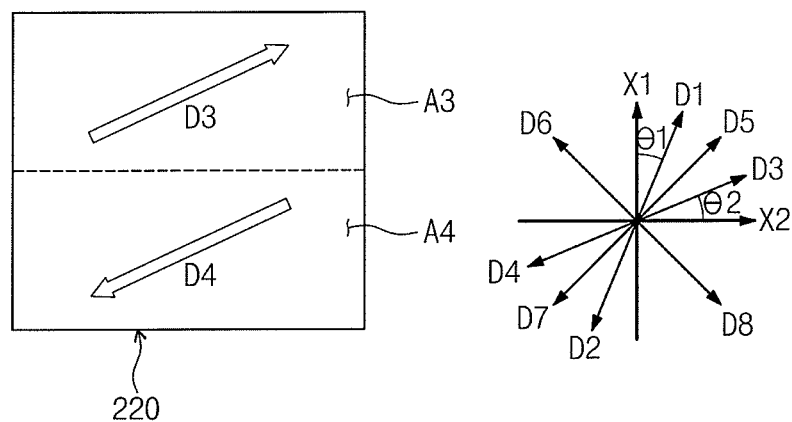
Figure 8C:
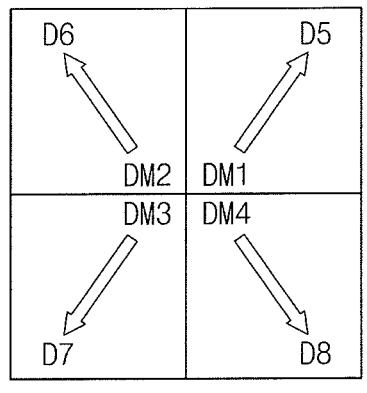
FIG. 8C is a plan view showing a direction of a liquid crystal director on a pixel electrode.
Figure 8C:
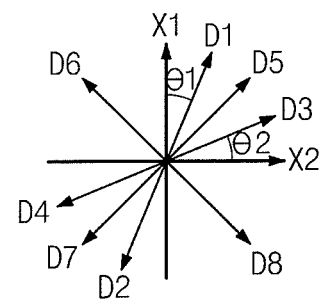

FIG. 8A is a plan view showing the alignment direction of the first alignment layer, FIG. 8B is a plan view showing the alignment direction of the second alignment layer, and FIG. 8C is a plan view showing a direction of a liquid crystal director on the pixel electrode.

Referring to FIG. 8A, the pixel area PA is divided into the first area A1 and the second area A2 on the first substrate 100, the first alignment layer 120 is photo-aligned in the first direction D1 in the first area A1, and the first alignment layer 120 is photo-aligned in the second direction D2 that is opposite to the first direction D1 in the second area A2. The first direction D1 makes the first angle $\theta_1$ in the clockwise direction with reference to the transmission axis X1, and the first angle $\theta_1$ is within the range of $0°<\theta_1<90°$.

The pixel area PA is divided into the third area A3 and the fourth area A4 on the second substrate 200. As shown in FIG. 8B, the second alignment layer 220 is photo-aligned in the third direction D3 in the third area A3, and the second alignment layer 220 is photo-aligned in the fourth direction D4 that is opposite to the third direction D3 in the fourth area A4. The third direction D3 makes the second angle $\theta_2$ with reference to the absorption axis X2 in a plan view, and the second angle $\theta_2$ is within the range of $0°<\theta_2<90°$.

When the first substrate 100 is coupled to the second substrate 200 to face each other, as shown in FIG. 8C, a first domain DM1 corresponding to an area in which the first and third areas A1 and A3 are overlapped with each other, a second domain DM2 corresponding to an area in which the first and fourth areas A1 and A4 are overlapped with each other, a third domain DM3 corresponding to an area in which the second and third areas A2 and A3 are overlapped with each other, and a fourth domain DM4 corresponding to an area in which the second and fourth areas A2 and A4 are overlapped with each other are formed on the pixel area PA.

The liquid crystal molecules may be aligned in different directions from each other in the first to fourth domains DM1~DM4. For example, the liquid crystal molecules may be aligned in a fifth direction D5 that is defined by a sum of vectors of the first and third directions D1 and D3 in the first domain DM1, aligned in a sixth direction D6 that is defined by a sum of vectors of the first and fourth directions D1 and D4 in the second domain DM2, aligned in a seventh direction D7 that is defined by a sum of vectors of the second and third directions D2 and D3 in the third domain DM3, and aligned in an eighth direction D8 that is defined by a sum of vectors of the second and fourth directions D2 and D4 in the fourth domain DM4.

When the first angle $\theta_1$ and the second angle $\theta_2$ have the same value, e. g., in case that the first angle $\theta_1$ and the second angle $\theta_2$ have a degree of about 22.5°, the alignment directions of the liquid crystal layer 300 may be inclined by about 45°, about 135°, about 225°, and about 315° with respect to the absorption axis X2 in the first, second, third, and fourth domains DM1, DM2, DM3, and DM4, respectively.

As described above, since the domains DM1-DM4 are formed in the pixel area PA to have different alignment directions from each other, the liquid crystal display may have a wide viewing angle. In addition, the aperture ratio and the transmittance of the liquid crystal display may be improved since no patterning is required for the pixel electrode to form the domains DM1-DM4. Further, in an electrically controlled birefringence (ECB) mode liquid crystal display using a vertical alignment liquid crystal, four exposure processes are required per one substrate to form directors aligned in four directions corresponding to four domains in one pixel area. However, according to the present exemplary embodiment, directors may be aligned in four directions by performing two exposure processes per one substrate. Thus, the processes for forming the directors may be simplified, thereby reducing the process time.

Also, in a twisted nematic (TN) mode liquid crystal display using the conventional vertical alignment liquid crystal, the alignment direction of the first substrate is substantially perpendicular to the alignment direction of the second substrate. However, in the present exemplary embodiment, the alignment directions of the first and second substrates make an angle within a range of about 0° to about 90° with reference to the transmission axis or the absorption axis, and thus, the alignment directions of the liquid crystal may be minutely controlled.

Since the first direction D1 is not perpendicular to the third direction D3 or the second direction D2 is not perpendicular to the fourth direction D4, the angle defined by the first direction D1 and the third direction D3 is different from the angle defined by the second direction D2 and the third direction D3. As an example, when the angle $\theta_1$ defined by the first direction D1 and the transmission axis X1 is about 22.5° and the angle $\theta_2$ defined by the third direction D3 and the absorption axis X2 is about 22.5° (e.g., about 67.5° with reference to the transmission axis X1), an angle between the first direction D1 and the third direction D3 is about 45° in the first domain DM1, but an angle between the second direction D2 and the third direction D3 is about 135°. Similarly, an angle between the second direction D2 and the fourth direction D4 is about 45°, however, an angle between the first direction D1 and the fourth direction D4 is about 135°.

Hereinafter, since the liquid crystal molecules move within an angle that is defined by the alignment directions of the first and second substrates in the domain when viewed in a plan view onto the first and second substrates, transmittance and driving voltage of the liquid crystal will be described. A case where the angle between the first direction D1 and the third direction D3 is about 45° will be referred to as a first case, and a case where the angle between the first direction D1 and the third direction D3 is about 135° will be referred to as a second case.

Figure 9A:
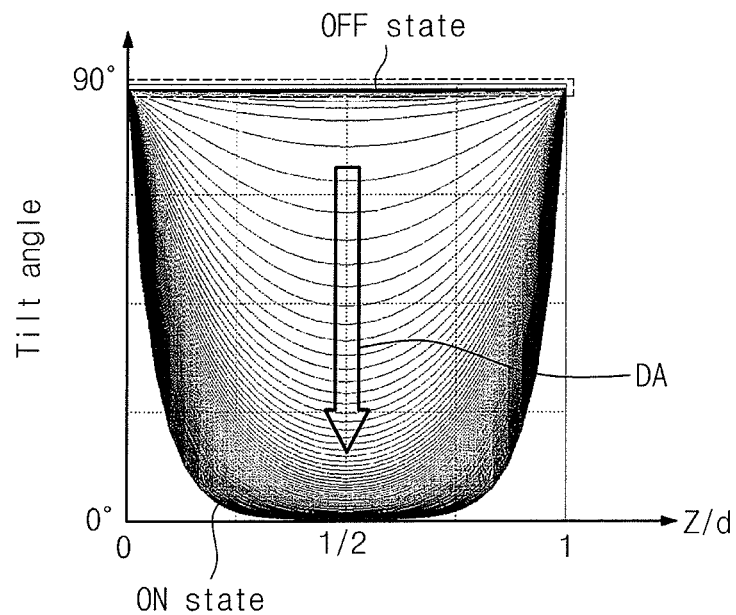
FIGS. 9A and 9B are graphs showing a change of a tilt angle between a surface of a first substrate and liquid crystal molecules.
Figure 9B:
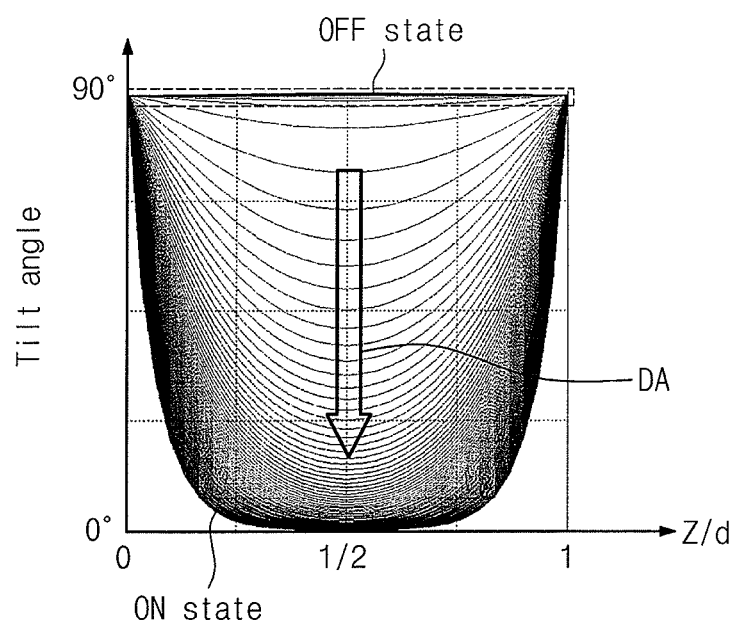

FIGS. 9A and 9B are graphs showing a change of a tilt angle between a surface of the first substrate and the liquid crystal molecules at respective points on an imaginary line vertically extended from the first substrate to the second substrate. For example, FIG. 9A is a graph illustrating the first case, and FIG. 9B is a graph illustrating the second case. In FIGS. 9A and 9B, an X-axis represents the points on an imaginary line vertically extended from the first substrate to the second substrate when assuming that a location of the first substrate is zero (0) and a cell gap between the first and second substrates is one (1), and a Y-axis represents an angle defined by the surface of the first substrate and the liquid crystal molecules.

Referring to FIGS. 9A and 9B, under no application of electric-field state (OFF state), the liquid crystal molecules in the liquid crystal layer 300 may maintain the pre-tilt angle by the first and second alignment layers in both of the first and second cases. When an electric field is formed by a voltage applied to the first and second substrates (ON state), the liquid crystal molecules start to move and the pre-tilt angle of the liquid crystal molecules may be changed in a direction indicated by directional arrow DA as shown in FIGS. 9A and 9B. Consequently, in both of the first and second cases under the application of electric field (ON state), the liquid crystal molecules arranged adjacent to the first and second substrates may maintain the pre-tilt angle by the first and second alignment layers, however, the liquid crystal molecules arranged adjacent to a center portion (½) of the liquid crystal layer 300 may have a pre-tilt angle close to zero degree.

Figure 10A:
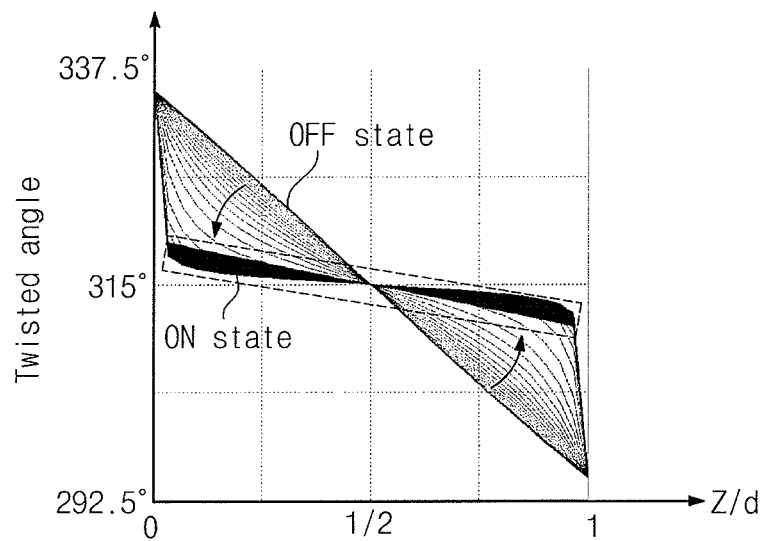
FIGS. 10A and 10B are graphs showing a rotation state of liquid crystal molecules in a plan view.
Figure 10B:
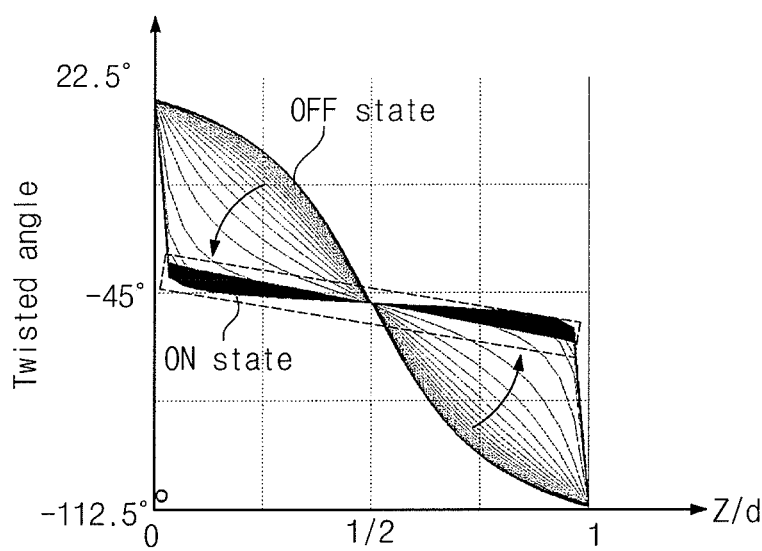

FIGS. 10A and 10B are graphs showing a rotational state of the liquid crystal molecules at the points on an imaginary line vertically extended from the first substrate to the second substrate in a plan view. FIG. 10A is a graph illustrating the first case, and FIG. 10B is a graph illustrating the second case. In FIGS. 10A and 10B, an X-axis represents the points on the imaginary line vertically extended from the first substrate to the second substrate when assuming that a location of the first substrate is zero (0) and a cell gap between the first and second substrates is one (1), and a Y-axis represents an angle, that is a twisted angle defined by the liquid crystal molecules and the absorption axis.

Referring to FIGS. 10A and 10B, under no application of electric-field state (OFF state), the liquid crystal molecules are aligned in the first direction and the third direction in both of the first and second cases. When the electric field is formed by the voltage applied to the first and second substrates (ON state), the liquid crystal molecules are rotated in both of the first and second cases, so that the angle defined by the liquid crystal molecules and the absorption axis at the points may be changed to the direction indicated by the directional arrow as shown in FIGS. 10A and 10B. Consequently, under the application of electric-field state (ON state), the liquid crystal molecules at the points may be rotated to be aligned in a direction that is defined by a sum of vectors of the alignment directions of the first and second substrates.

As shown in FIGS. 9A, 9B, 10A and 10B, the liquid crystal molecules have operated in a broadly similar way in both of the first and second cases.

Figure 11:
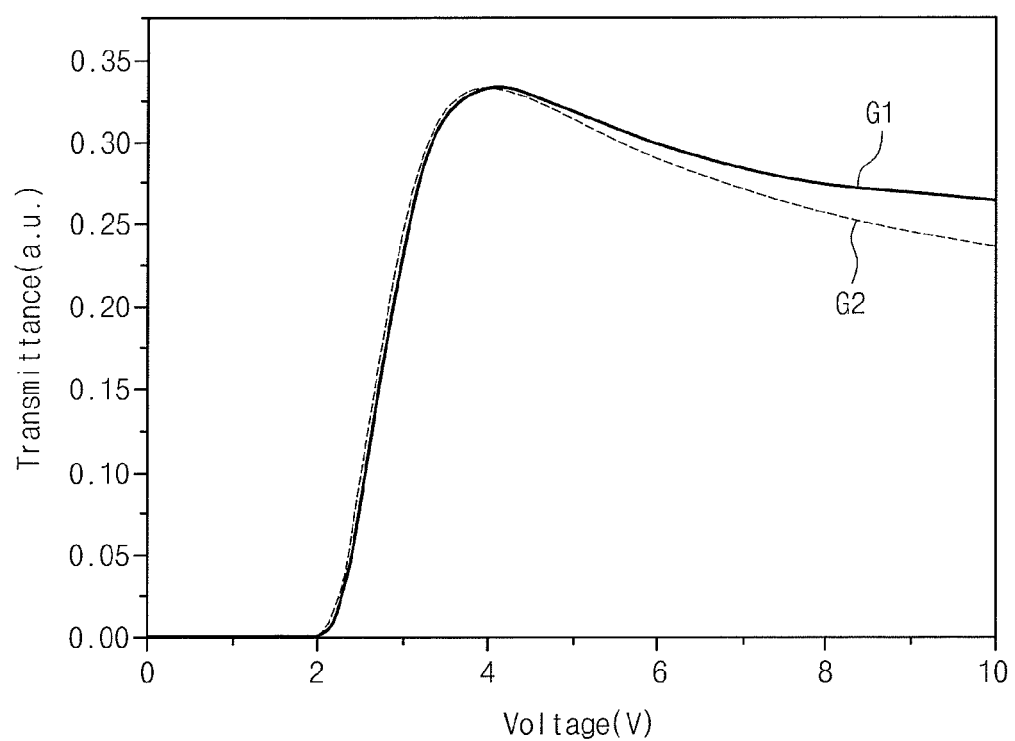
FIG. 11 is a graph showing a relation between a driving voltage and a transmittance of a liquid crystal layer according to a whole rotatable range of liquid crystal molecules in a plan view.

FIG. 11 is a graph showing a relation between the driving voltage and the transmittance of the liquid crystal layer according to a whole rotatable range of the liquid crystal molecules in a plan view. In FIG. 11, an X-axis represents the driving voltage V and a Y-axis represents the transmittance (a. u., arbitrary unit) of the liquid crystal layer.

Referring to FIG. 11, in both of the first and second cases, the transmittance is rapidly increased to its maximum value as the voltage increases, and then the transmittance is gradually decreased after the maximum value. In detail, the two graphs G1 and G2 respectively indicating the first and second cases show almost the same transmittance with respect to the voltage until the transmittance reaches the maximum value, and after the maximum value of the transmittance, the transmittance G2 of the second case becomes lower than the transmittance G1 of the first case.

Figure 12:
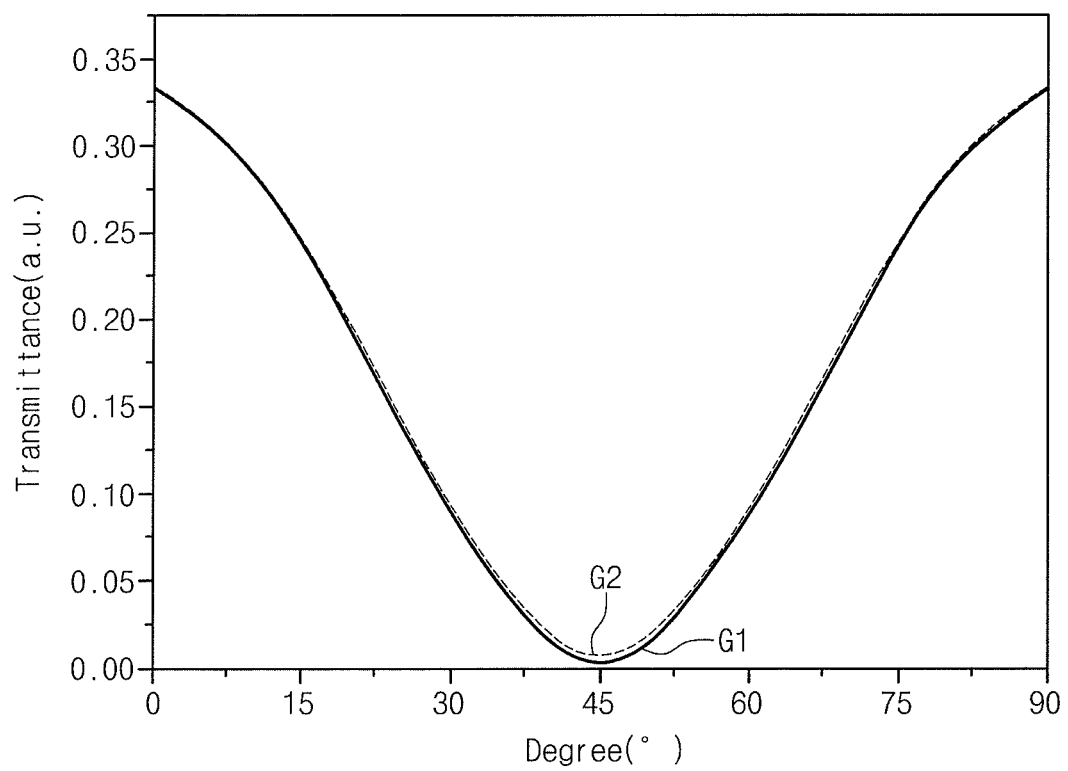
FIG. 12 is a graph showing a relation between a transmittance of a liquid crystal layer and an angle defined by an absorption axis of the polarizing plate and a display panel according to a whole rotatable range of liquid crystal molecules in a plan view.

FIG. 12 is a graph showing a relation between a transmittance of a liquid crystal layer and an angle defined by the absorption axis of the polarizing plate and the display panel according to the whole rotatable range of the liquid crystal molecules in a plan view. In FIG. 12, an X-axis represents the angle defined by the absorption axis of the polarizing plate and the display panel and a Y-axis represents the transmittance (a. u., arbitrary unit) of the liquid crystal layer.

Referring to FIG. 12, in both of the first and second cases, two graphs G1 and G2 respectively indicating the first and second cases represents a minimum transmittance of the liquid crystal layer when the angle is about 45 degrees, and the two cases have the similar characteristics.

As described above, the first case and the second case show similar characteristics in the driving voltage, the transmittance, and the operation of the liquid crystal even though the first and second cases have the whole rotatable ranges different from each other in a plan view. Thus, the liquid crystal display may have no operational difficulty even though the first and third domains DM1 and DM3 having the same operational range as the first case and the second and fourth domains DM2 and DM4 having the same operational range as the second case are arranged in the same pixel.

According to the above, the liquid crystal display may obtain various alignment directions of the liquid crystal layer by adjusting the angle made by the alignment directions of the first and third directions and the transmission axis or the absorption axis. Thus, the maximum transmittance and the viewing angle may be controlled according to a required specification for the liquid crystal display. In addition, the directors in four directions corresponding to four domains may be formed in one pixel area by the execution of the two exposure processes per one substrate, thereby simplifying the processes for the liquid crystal display and reducing the process time.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display comprising:
a display panel including
a first substrate including a plurality of pixel areas and a plurality of pixel electrodes in the pixel areas, respectively,
a second substrate including a common electrode facing the first substrate and the pixel electrodes,
a first alignment layer formed on the pixel electrodes includes a first area aligned in a first direction and a second area aligned in a second direction opposite to the first direction;
a second alignment layer formed on the common electrode includes a third area aligned in a third direction different from the first direction and a fourth area aligned in a fourth direction opposite to the third direction, wherein the first direction of the first area is not perpendicular to the third direction of the third area and wherein the second direction of the second area is not perpendicular to the fourth direction of the fourth area;
a liquid crystal layer disposed between the first alignment layer and the second alignment layer and including liquid crystal molecules that are aligned in different directions from each other in plural domains defined by the first area, the second area, the third area and the fourth area, and the different directions are defined radially with respect to the center of the plural domains; and
a polarizing plate attached to one surface of the display panel and including a transmission axis and an absorption axis that is substantially perpendicular to the transmission axis.

2. A liquid crystal display comprising:
a display panel displaying an image; and
a polarizing plate attached to one surface of the display panel and including a transmission axis and an absorption axis that is substantially perpendicular to the transmission axis,
wherein the display panel comprises:
a first substrate including a plurality of pixel areas and a plurality of pixel electrodes arranged in the pixel areas, respectively;
a first alignment layer covering the pixel electrodes and including a first area aligned in a first direction that makes a first angle in a clock-wise direction with reference to the transmission axis in a plan view and a second area aligned in a second direction that is opposite to the first direction;
a second substrate including a common electrode facing the pixel electrodes;
a second alignment layer covering the common electrode and including a third area aligned in a third direction that makes a second angle in a counter clockwise direction with reference to the absorption axis and a fourth area aligned in a fourth direction that is opposite to the third direction, the third direction being different from the first and second directions, wherein the first direction of the first area is not perpendicular to the third direction of the third area and wherein the second direction of the second area is not perpendicular to the fourth direction of the fourth area; and
a liquid crystal layer disposed between the first alignment layer and the second alignment layer and including liquid crystal molecules that are aligned in different directions from each other in a plurality of domains defined in each of the pixel areas, and the different directions are defined radially with respect to the center of the plural domains,
wherein the first area and the second area are obtained by dividing each of the pixel areas into two areas along a direction substantially parallel to the transmission axis, and the third area and the fourth area are obtained by dividing an area of the second substrate corresponding to each of the pixel areas into two areas along a direction substantially parallel to the absorption axis.

3. The liquid crystal display of claim 2, wherein the first alignment layer and the second alignment layer are photo-aligned.

4. The liquid crystal display of claim 2, wherein the first angle is defined as ($\theta_1$), and is within a range of $0°<\theta_1<90°$, and the second angle is defined as ($\theta_2$) and is within a range of $0°<\theta_2<90°$.

5. The liquid crystal display of claim 4, wherein the first angle is equal to the second angle.

6. The liquid crystal display of claim 4, wherein the domains comprise a first domain in which the first area is overlapped with the third area, a second domain in which the first area is overlapped with the fourth area, a third domain in which the second area is overlapped with the third area, and a fourth domain in which the second area is overlapped with the fourth area, and the liquid crystal molecules are aligned in a fifth direction that is defined by a sum of the vectors of the first direction and the third direction in the first domain, aligned in a sixth direction that is defined by a sum of vectors of the first direction and the fourth direction, aligned in a seventh direction that is defined by a sum of vectors of the second direction and the third direction, and aligned in an eighth direction that is defined by a sum of vectors of the second direction and the fourth direction.

7. The liquid crystal display of claim 6, wherein the fifth direction, the sixth direction, the seventh direction, and the eighth direction are inclined by about 45°, about 135°, about 225°, and about 315° with respect to the absorption axis, respectively.

8. The liquid crystal display of claim 2, wherein the liquid crystal molecules have a negative dielectric anisotropy.

9. The liquid crystal display panel of claim 2, wherein the first alignment layer includes a polymer material selected from the group consisting of polyvinyl cinnamate-containing material (PVCN), polysiloxane cinnamate-containing material (PSCN), cellulose cinnamate-containing material (CelCN).

10. The liquid crystal display panel of claim 9, wherein the second alignment layer includes a polymer material selected from the group consisting of polyvinyl cinnamate-containing material (PVCN), polysiloxane cinnamate-containing material (PSCN), cellulose cinnamate-containing material (CelCN).

11. The liquid crystal display panel of claim 2, wherein the first alignment layer completely covers the pixel electrodes in the pixel area and the second alignment layer completely covers the common electrode in the pixel area.

12. The liquid crystal display panel of claim 2, wherein the pixel areas each have a shape selected from the group consisting of a rectangular shape, a V-shape and a Z-shape.

13. The liquid crystal display panel of claim 12, wherein the pixel areas each have a rectangular shape.

14. The liquid crystal display panel of claim 2, wherein first substrate further comprises a plurality of gate lines, a plurality of data lines, and a plurality of thin film transistors (TFTs) each formed thereon.

15. The liquid crystal display panel of claim 14, wherein the gate lines are on the first substrate and extended in one direction and the data lines are arranged on the first substrate and cross the gate lines to be insulated from the gate lines.

16. The liquid crystal display panel of claim 15, wherein the TFTs are arranged adjacent to an area where the gate lines cross the data lines, wherein the TFTs each include a gate electrode branched from the gate line, a source electrode branched from the data line and a drain electrode spaced apart from the source electrode and wherein the pixel electrode is connected to the drain electrode.

17. The liquid crystal display of claim 16, further comprising a semiconductor pattern arranged above the gate electrode and a first insulating layer interposed therebetween, wherein the source electrode and the drain electrode spaced apart from each other are arranged on the semiconductor pattern, and wherein the data lines are arranged on a same layer where the source electrode and the drain electrode are arranged.

18. The liquid crystal display of claim 17, further comprising a second insulating layer arranged on the first insulating layer on which the source electrode and drain electrode are arranged, and a protective layer is arranged on the second insulating layer, the pixel electrodes are arranged on the protective layer and the pixel electrode is electrically connected to the drain electrode through a contact hole formed through the second insulating layer and the protective layer.

19. The liquid crystal display panel of claim 14, wherein the second substrate further comprises a plurality of color filters and a black matrix formed thereon, and wherein the black matrix is disposed between the color filters.

20. The liquid crystal display panel of claim 19, wherein the common electrode is formed over an entire surface of the color filters and the black matrix.

* * * * *